United States Patent [19]

Churchill et al.

[11] 4,127,550

[45] Nov. 28, 1978

[54] METHOD FOR IMPROVING THE SCRUB-RESISTANT PROPERTIES OF WATER-BASED LATEX PAINT COMPOSITIONS

[75] Inventors: Charles M. Churchill; George A. Allen, both of Spartanburg; John F. Stadalsky, Campobello, all of S.C.

[73] Assignee: Milliken Research Corporation, Spartanburg, S.C.

[21] Appl. No.: 818,355

[22] Filed: Jul. 25, 1977

Related U.S. Application Data

[63] Continuation-in-part of Ser. No. 738,637, Nov. 3, 1976, abandoned.

[51] Int. Cl.² .......................... C09D 3/74; C09D 5/02
[52] U.S. Cl. ...................... 260/29.6 E; 260/29.6 ME
[58] Field of Search ................. 260/29.6 E, 29.6 ME, 260/613 B

[56] References Cited

U.S. PATENT DOCUMENTS

| 3,112,282 | 11/1963 | Jones et al. | 260/29.6 ME |
| 3,226,349 | 12/1965 | Cull | 260/29.6 ME |
| 3,264,238 | 8/1966 | Wallen | 260/29.6 ME |
| 3,758,432 | 9/1973 | Hopper | 260/29.6 ME |
| 3,759,861 | 9/1973 | Shimokawa | 260/29.6 E |
| 4,001,159 | 1/1977 | Imai et al. | 260/29.6 ME |

FOREIGN PATENT DOCUMENTS 854,952  11/1960  United Kingdom ................ 260/613 B

*Primary Examiner*—Ronald W. Griffin
*Attorney, Agent, or Firm*—Glen M. Burdick; H. William Petry

[57] ABSTRACT

The scrub-resistant properties of water-based latex paint compositions are readily improved by incorporating into such paint compositions an effective minor amount of an alkoxylate obtained by alkoxylating the alkylation reaction products formed by the acid catalyzed alkylation of a phenolic compound with styrene or a substituted styrene, the alkoxylate being further characterized as containing from about 6 to about 30 alkoxy units per molecule.

6 Claims, No Drawings

METHOD FOR IMPROVING THE SCRUB-RESISTANT PROPERTIES OF WATER-BASED LATEX PAINT COMPOSITIONS

This application is a continuation-in-part of our co-pending application, Ser. No. 738,637, filed Nov. 3, 1976, now abandoned.

This invention relates to a method for improving the scrub-resistant properties of water-based latex paint compositions. In one aspect it relates to the use of polyaromatic alkoxylates obtained by the alkoxylation of the alkylation reaction products produced by the alkylation of a phenolic compound with styrene or a substituted styrene to improve the scrub-resistant properties of water-based latex paint compositions.

Water-based paint formulations, more commonly known as latex paint compositions, have, in recent years, found wide acceptance for the coating of surfaces, both interior and exterior. Such latex paints consist basically of pigment and a latex emulsion. However, other additives, such as pigment-dispersing agents, preservatives, thickeners, de-foamers, and freeze-thaw stabilizers are also employed to impart the desired properties to the latex paints. While latex paint compositions are generally more rapid drying, possess improved weathering characteristics, and are more light-fast than the organic solvent or oil base paints, problems have, nonetheless been encountered in that often the scrub-resistant properties of water-based latex paints are less than desirable. Thus, a need has long been recognized for improved water based latex paint formulations which have improved scrub resistant properties, while maintaining other desired properties such as quick drying, weathering, and lightfastness. It is to such an improvement that the present invention is directed.

According to the present invention, we have now discovered a method for improving the scrub-resistant properties of water-based latex paint compositions which comprises incorporating into such paint compositions a minor effective amount of an polyaromatic alkoxylate which is obtained by alkoxylating an alkylation reaction product formed by the acid catalyzed alkylation of a phenolic compound with styrene or a substituted styrene. The degree of alkoxylation employed to produce the alkoxylate can vary widely, but will generally be an amount sufficient to provide from about 6 to about 30 alkoxy units per molecule.

The alkylation reaction product intermediates employed to form the polyaromatic alkoxylates for incorporation into water-based latex paint compositions to improve the scrub-resistant properties of such paint compositions can be formed by the acid catalyzed alkylation of a phenolic compound with styrene or a substituted sytrene employing any suitable alkylation procedure well known in the art. The particular phenolic compound employed can also vary widely, but will generally be selected from the group consisting of phenol, alkyl substituted phenols, aryl substituted phenols, alkylaryl substituted phenols and mixtures thereof.

Such phenolic compounds can be represented by the general formula:

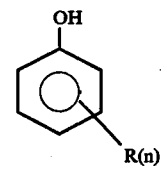

wherein R is an alkyl group containing from 1 to about 12 carbon atoms, an aryl group, such as phenyl and the like or an alkylaryl group in which the alkyl and aryl moieties are as previously described, and $n$ is an integer of 0, 1, 2, 3 or 4.

The alkylating agent employed to produce the alkylation reaction product intermediates can be styrene or a substituted styrene. The term "substituted styrene" as used herein is to be understood to include alkyl, aryl, and alkylaryl group substitution into the styrene molecule and such substitution can be in the styrene molecule at the $\alpha$ or $\beta$ position of the vinyl group or in the aromatic ring. Further, such substitution can be any combination of the above. The substituted styrene compounds can be represented by the general formula:

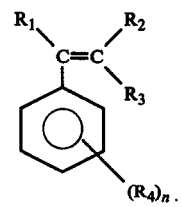

wherein $R_1$, $R_2$, $R_3$ and $R_4$ are hydrogen, an alkyl group containing from 1 to about 12 carbon atoms, an aryl group, such as phenyl, an alkylaryl group in which the alkyl and aryl moieties are as previously set forth, and $n$ is an integer of 0, 1, 2, 3, 4 or 5. In addition, the substituted styrene compounds can also be understood to include compounds having the formula:

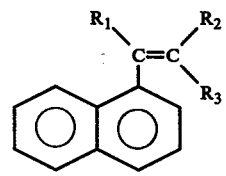

wherein $R_1$, $R_2$ and $R_3$ are as defined above.

The alkylation temperatures employed in producing the alkylation reaction products will vary widely, but will generally be from about 50° C. to about 150° C. Desirable results have been obtained when the alkylation temperature is from about 120° C. to about 140° C., the alkylating agent is styrene or $\alpha$-methyl styrene and the phenolic compound is phenol, nonyl phenol or p-cumyl phenol.

The ratio of phenolic compound, specifically phenol, nonyl phenol or p-cumyl phenol, to styrene or a substituted styrene, specifically $\alpha$-methyl styrene, can also be varied over wide limits. However, it is desirable that the alkylating agent be employed in at least a stoichiometric amount based upon the amount of phenolic compound. Generally, it is desirable to employ a molar ratio of the phenolic compound to the alkylating agent in the range from about 1:1 to about 1:2, respectively.

The amount of alkylating catalyst employed to effect the alkylation reaction between the phenolic compound and the styrene or substituted styrene can vary widely, such depending to a large extent upon the particular catalyst chosen. However, the amount of catalyst employed will generally range from about 0.5 to about 10 weight percent, based upon the amount of alkylating agent employed in the reaction. Likewise, any suitable acid catalyst which can effectively initiate the alkylation reaction between the phenolic compound and the styrene or substituted styrene can be employed. Typical of such acid catalysts are zinc chloride, aluminum chloride, $BF_3$, $H_2SO_4$, $H_3PO_4$, and mixtures thereof.

The alkylation reaction can be carried out in a continuous or batch wise manner. In either manner, effective contact time between the catalyzed reactants is in order of from about 15 minutes to about 60 minutes. The precise time needed for effecting alkylation is obviously dependent upon a number of factors, including the amount of catalyst used, the ratio of phenolic compound to styrene or substituted styrene, temperature, pressure, and the like.

Once the desired alkylation reaction has occurred, the reaction mixture is allowed to cool to a temperature in the range of from about ambient to about 90° C. and thereafter an effective amount of a caustic material, such as calcium hydroxide, potassium hydroxide, and the like, is admixed into the reaction mixture to neutralize the acid catalyst. Once the catalyst has been effectively neutralized, the neutralized alkylation reaction effluent is subjected to separation steps, such as vacuum distillation, wherein unreacted starting materials and water are removed. The stripped reaction effluent is then subjected to additional separation steps for removal of the catalyst sludge. The separation of the catalyst sludge can be accomplished by any suitable means, such as filtering the neutralized alkylation reaction effluent or by introducing the neutralized effluent into a separator where the catalyst sludge is removed. When filtration is employed for removing the catalyst sludge, such filtration is preferably carried out while maintaining the neutralized alkylation reaction effluent at a temperature in the range of from about 100° C. to about 120° C.

The resulting alkylation reaction effluent, hereinafter referred to as alkylation product, is then alkoxylated. The degree of alkoxylation can vary widely, but will generally be sufficient to provide an alkoxylated alkylate product containing from about 6 to about 30 alkoxy units per molecule. Preferably, the degree of alkoxylation of the alkylate product will be sufficient to provide an alkoxylated alkylate product containing from about 10 to about 16 alkoxy units per molecule. Any suitable alkoxylating procedure can be employed to alkoxylate the alkylate product. Such procedures are well known in the art.

The alkylene oxide constituent employed in the alkoxylation of the alkylate product can be ethylene oxide or a mixture of ethylene oxide and propylene oxide. When the alkoxy moiety of the alkoxylates contains a mixture of ethylene oxide and propylene oxide, it is desirable that the amount of ethylene oxide constituent in the polymer be at least 40 weight percent, preferable from about 60 to 80 weight percent of the total polymer weight.

We have found that by incorporating a minor effective amount of the before-described alkoxylates into a water-based latex paint composition, the scrub-resistant properties of such paint composition can be readily improved without sacrificing other desired properties of the latex paint composition such as color acceptance, dry grinding, pigment dispersion, and the like. The amount of alkoxylates employed to provide the desired scrub-resistance properties to the latex paint composition can vary widely. However, generally desirable results can be obtained when the amount of alkoxylate employed is from about 0.1 to about 1.5 weight percent of the latex paint composition.

In order to more fully describe the process for producing the alkoxylates used in latex paint compositions to improve the scrub-resistant properties of such paint compositions the following generic chemical reaction system is set forth. However, it is to be understood that the reaction scheme is merely for the purposes of illustration and is not to be construed as unduly limiting the scope of the present invention.

Latex paint compositions are well known in the paint art. Such paint compositions are basically formed by combining pigment and an aqueous admixture containing a suspension of polymer particles. However, in order to obtain certain desired properties a number of additives are incorporated into the aqueous admixture. These additives include pigment-dispersing agents, preservatives, thickners, defoamers, and freeze-thaw stabilizers. However, as previously stated, such latex paint compositions has generally lacked good scrub-resistant properties. We have quite surprisingly found that by incorporating an effective amount of the before-described alkoxylates into paint compositions, the scrub-resistant properties of such latex paint compositions can readily be improved.

In order to more fully describe the process for producing the alkoxylates used in the latex paint compositions to improve the scrub-resistant properties of such paint compositions, the following generic chemical reaction system is set forth. However, it is to be understood that the reaction scheme is merely for the purposes of illustration and is not to be construed as unduly limiting the scope of the present invention.

ALKYLATION

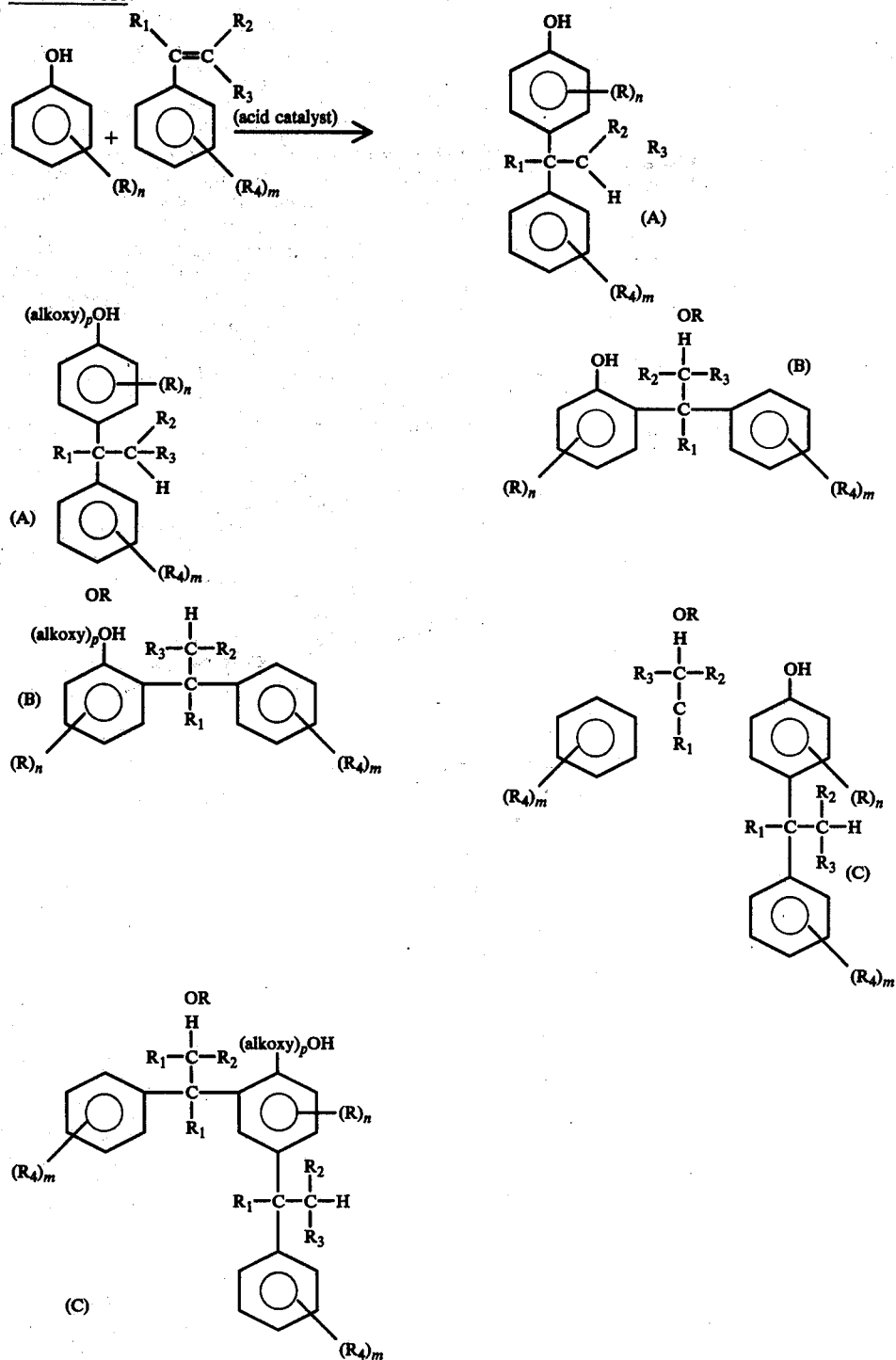

wherein

R is an alkyl group, aryl group or combinations thereof, $n = 0, 1, 2, 3$ or 4, $R_1$, $R_2$, $R_3$ and $R_4$ are hydrogen, alkyl, aryl or combinations thereof, $m = 0, 1, 2, 3, 4$ or 5, and $p$ is from about 6 to about 30.

The above general reaction scheme clearly illustrates the preparation of the alkoxylates useful in the subject invention. Further, such reaction scheme indicates the complexity of the reaction and the number of isomeric constituents which may be present in the alkoxylates.

In order to further illustrate the details of the process for producing the before-described alkoxylates and the use of such alkoxylates in latex paint compositions, the following specific examples are given. These examples are presented primarily for the purpose of illustration and any enumeration or details contained therein are not to be interpreted as a limitation on the invention except as indicated in the appended claims. All parts referred to in these examples are parts by weight unless otherwise indicated.

A. Alkylation of Phenolic Compound

A series of acid catalyzed alkylation reactions are conducted in which a phenolic compound is alkylated with a styrene compound. In each reaction the phenolic compound is charged into a glass lined reactor vessel equipped with a stirrer. The phenolic compound is then heated (with or without the presence of the acid catalyst) while under agitation to a temperature of from about 70° C.–90° C. Thereafter, the catalyst, if not previously added, is added to the phenolic compound in the reactor as is the styrene compound. The reactants are then brought up to a temperature of from about 20° C.–150° C. After the addition of the styrene compound is completed, a nitrogen sparge is commenced and the reaction product is post-reacted at a temperature of about 20° C.–150° C. for a period of time from about 40 minutes to about 24 hours. The resulting product is then cooled to about 80° C.–90° C. and the catalyst neutralized by the addition of calcium hydroxide. The cooled, catalyzed neutralized product is then vacuum stripped at a temperature of from about 80° C.–140° C. and at a pressure of 25-29 inches of mercury to remove any unreacted phenolic compound and water. Thereafter, the product is filtered at a temperature of from about 100° C.–120° C. to remove solid waste materials. The amounts of phenolic compound to styrene compound catalyst and reaction conditions for each experiment are tabulated in Table I.

TABLE I
REACTIONS

| No. | Phenol/Styrene Ratio | Catalyst | Styrene Addition | Rate | Reaction Time | Reaction Temp. °C |
|---|---|---|---|---|---|---|
| 1 | 1:1 | $H_2SC_4$/$H_3PO_2$ | Slow Addition | 7.89 g/m | 40 min. | 135–140 |
| 2 | 0.8:1 | " | Slow Addition | 2.43 g/m | 2 hrs. 10 min. | 135–140 |
| 3 | 0.5:1 | " | Slow Addition | 1.26 g/m | 4 hrs. 10 min. | 130–135, 140 |
| 4 | 0.5:1 | " | Slow Addition | 1.97 g/m | 3 hrs. | 130–135, 140 |
| 5 | 0.5:1 (lg. run) | " | Slow Addition 2 step | 9.55 g/m | 12 hrs. | 130–135, 140 |
| 6 | 1:1 | $H_2SO_4$/$H_3PO_2$[1] | Slow Addition | 2.08 g/m | 4 hrs. | 145 |
| 7 | 1:2 | $H_2SO_4$/$H_3PO_2$[2] | Slow Addition | 2.97 g/m | 5 hrs. | 145 |
| 8 | phenol/methyl styrene 1:1 | $H_2SO_4$/$H_3PO_2$[3] | Slow Addition | 3.93 g/m | 2.5 hrs. | 140–145 |
| 9 | 1:2 | $H_2SO_4$/$H_3PO_2$[4] | Slow Addition | 1.97 g/m | 4 hrs. | 140–145 |
| 10 | nonyl phenol/methyl styrene 1:1 | $H_2SO_4$/$H_3PO_2$[5] | Slow Addition | 1.07 g/m | 3 hrs. | 140–145 |

(1) 3.5 weight percent $H_2SO_4$(50% solution)
    1.5 weight percent $H_3PO_2$
(2) 7.0 weight percent $H_2SO_4$(50% solution)
    3.0 weight percent $H_3PO_2$
(3) 7.0 weight percent $H_2SO_4$(50% solution)
    3.0 weight percent $H_3PO_2$
(4) 7.0 weight percent $H_2SO_4$(50% solution)
    3.0 weight percent $H_3PO_2$
(5) 3.5 weight percent $H_2SO_4$(50% solution)
    1.5 weight percent $H_3PO_2$ B. Alkoxylation of Alkylate The alkylate produced in accordance with Experiment I of Preparation A above and a catalytic amount of potassium hydroxide are charged into a reaction vessel. The resulting admixture is then heated and vacuum stripped to remove trace amounts of water. The admixture is heated to 145° C., while being agitated, and an effective amount of ethylene oxide is slowly added to the heated admixture of alkylate and potassium hydroxide while maintaining the temperature of the admixture at 145° C. for about 4 to 5 hours. Thereafter, the resulting ethoxylated product is cooled to room temperature and analyzed for its hydroxyl number. The hydroxyl number indicates that about 10 moles of ethylene oxide has condensed with about one mole of the alkylate.

The ethoxylated alkylate produced as set forth in Procedure B is incorporated into a polyvinyl acetate latex paint formulation utilizing UCAR 360, a polyvinyl acetate latex manufactured by Union Carbide Corporation. The particular formulation being an interior latex flat white formulation. The ethoxylated alkylate product was used in conjunction with potassium tripolyphosphate rather than the latex manufacturer's suggested dispersant combination and the properties of the paint composition are determined and compared with the standard recommended formulation.

EXAMPLE
FORMULATION OF Polyvinyl ACETATE LATEX PAINT COMPOSITIONS

| | Control 1 | Control 2 | No. 1 |
|---|---|---|---|
| Water | 180 | 180 | 180 |
| Lecithin | 4 | — | — |
| Alkoxylated Alkylate Dispersant | — | — | 3 |
| Dispersant[a] | — | 8 | — |
| Ethoxylated Nonyl Phenol | 2 | 2 | — |
| Ethylene Glycol | 15 | 15 | 15 |
| Potassium Tripolyphosphate | 2 | — | 2 |
| Mineral Oil Based Defoamer | 2 | 2 | 2 |
| Mildewcide | .5 | .5 | .5 |
| $TiO_2$ Pigment | 180 | 180 | 180 |
| Clay | 150 | 150 | 150 |
| Collodial Silica | 150 | 150 | 150 |
| Disperse on High Speed Disperser Then Add | | | |
| Cellulose Derivative 2% Solution | 250 | 250 | 250 |
| Coalescing Agent | 8 | 8 | 8 |

EXAMPLE-continued

FORMULATION OF Polyvinyl ACETATE LATEX PAINT COMPOSITIONS

|  | Control 1 | Control 2 | No. 1 |
|---|---|---|---|
| UCAR 360 Latex | 225 | 225 | 225 |
| Viscosity (KU) | 107 | 109 | 108 |
| PVC | 60 | 60 | 60 |

(a) Standard dispersant - sodium salt of carboxylate polyelectrolyte

Comparative data is then accumulated from testing of each of the paint formulations. Such data is as follows:

VINYL ACETATE INTERIOR FLAT WHITE

|  |  | Control 1 | Control 2 | No. 1 |
|---|---|---|---|---|
| Color Acceptance | **Score | 10 | 8 | 10 |
| Dry Grinding | **Score | 10 | 9 | 10 |
| Scrub Test (Cycles) |  | 527 | 519 | 600 |
| Pigment Dispersion |  |  |  |  |
| 5 Min. RT |  | 76/150 | 79/150 | 79/150 |
| 10 Min.-12.5° F |  | 68/150 | 83/150 | 72/150 |
| **Score |  | Performance | Effect |  |
| 10 |  | Excellent | None |  |
| 9 |  |  |  |  |
| 8 |  | Very Good | Very Slight |  |
| 6 |  | Good | Slight |  |
| 4 |  | Fair | Moderate |  |
| 2 |  | Poor | Considerable |  |

The above data clearly indicates that the incorporation of an alkoxylated alkylate into a polyvinyl acetate latex paint formulation readily maintains excellent color acceptance and dry grinding power and improves the scrubbability. Further, such improved properties is obtained without sacrificing other properties of the latex paint composition when employing an alkoxylated alkylate in relatively small amounts.

Having thus described the invention, we claim:

1. A method for improving the scrub-resistant properties of a water-based latex paint composition which consists essentially of incorporating into said latex paint composition a minor effective amount of an alkoxylate of an alkylation reaction product formed by the acid catalyzed alkylation of a phenolic compound with an alkylation agent selected from the group consisting of styrene and a substituted styrene, said alkoxyate being further characterized as containing from about 6 to about 30 alkoxy units per molecule.

2. The method for improving the scrub-resistant properties of a water-based latex paint composition according to claim 1 wherein said phenolic compound is represented by the formula

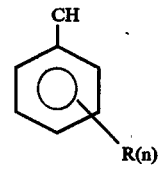

wherein R is selected from the group consisting of an alkyl group containing from 1 to about 12 carbon atoms, an aryl group, and an alkylaryl group in which the alkyl moiety contains from 1 to about 12 carbon atoms, $n$ is an integer of from 0 to 4, inclusive, and wherein said alkylating agent is represented by the formula

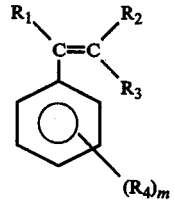

wherein $R_1$, $R_2$, $R_3$ and $R_4$ are selectd from the group consisting of hydrogen, an alkyl group containing from 1 to about 12 carbon atoms, an aryl group, and an alkylaryl group in which the alkyl moiety contains from 1 to about 12 carbon atoms and $m$ is an integer of from 0 to 5, inclusive.

3. The method for improving the scrub-resistant properties of a water-based latex paint composition of claim 2 wherein said minor effective amount is from about 0.1 to about 1.5 weight percent, based on the weight of said latex paint composition and wherein said alkoxylate contains from about 10 to about 16 alkoxy units per molecule.

4. The method for improving the scrub-resistant properties of a water-based latex paint composition according to claim 3 wherein said alkoxy units are selected from the group consisting of ethyleneoxy and mixtures of ethyleneoxy and propyleneoxy, said mixtures further being characterized as containing at least about 40 weight percent ethyleneoxy, based on total weight of alkoxy units in the molecule.

5. The method for improving the scrub-resistant properties of a water-based latex paint composition according to claim 4 wherein said alkoxy units are a mixture of ethyleneoxy and propyleneoxy and said ethyleneoxy constituent is present in an amount of from about 60 to about 80 weight percent of the total alkoxy units.

6. The method for improving the scrub-resistant properties of a water-based latex paint composition according to claim 3 wherein said phenolic compound is selected from the group consisting of phenol, nonyl phenol and p-cumyl phenol, said alkylating agent is selected from the group consisting of styrene and α-methyl styrene, and said alkoxy units are ethyleneoxy units.

* * * * *